(12) United States Patent
Yamane

(10) Patent No.: US 9,212,887 B2
(45) Date of Patent: Dec. 15, 2015

(54) METHOD FOR MEASURING REFERENCE POINT OF INCLINED ROTATING TABLE IN WIRE ELECTRIC DISCHARGE MACHINE AND MEASURING JIG

(71) Applicant: FANUC Corporation, Yamanashi (JP)

(72) Inventor: Hikaru Yamane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 14/267,917

(22) Filed: May 2, 2014

(65) Prior Publication Data

US 2014/0331510 A1   Nov. 13, 2014

(30) Foreign Application Priority Data

May 10, 2013   (JP) .................................. 2013-100710

(51) Int. Cl.
*G01B 5/00* (2006.01)
*G01B 5/004* (2006.01)
*B23H 11/00* (2006.01)
*G01B 21/04* (2006.01)
*G01B 3/30* (2006.01)
*B23H 7/02* (2006.01)

(52) U.S. Cl.
CPC .............. *G01B 5/004* (2013.01); *B23H 11/003* (2013.01); *G01B 3/30* (2013.01); *G01B 21/042* (2013.01); *B23H 7/02* (2013.01); *B23H 2500/20* (2013.01); *B23Q 2220/004* (2013.01)

(58) Field of Classification Search
CPC ........... G01B 5/004; G01B 5/008; G01B 1/00
USPC ............................................ 33/520, 502, 503
See application file for complete search history.

(56) References Cited

U.S. PATENT DOCUMENTS

| 4,506,336 | A | * | 3/1985 | Hird ............................ 178/18.01 |
| 2006/0201010 | A1 | | 9/2006 | Maier et al. |
| 2011/0040523 | A1 | | 2/2011 | Matsushita |
| 2014/0331510 | A1 | * | 11/2014 | Yamane ........................... 33/520 |

(Continued)

FOREIGN PATENT DOCUMENTS

EP   1696289 A1     8/2006
EP   2801438 A1 *  11/2014

(Continued)

OTHER PUBLICATIONS

Office Action mailed Sep. 30, 2014, corresponding to Japanese patent application No. 2013-100710.

(Continued)

*Primary Examiner* — Yaritza Guadalupe-McCall
(74) *Attorney, Agent, or Firm* — Hauptman Ham, LLP

(57) ABSTRACT

A reference point on a table center of an inclined rotating table in a wire electric discharge machine is obtained using a measuring jig. A biaxial rotation unit is placed on a table of the wire electric discharge machine. The measuring jig has a shape most suitable for reference point measurement using a contact sensing function of a wire electrode which a wire electric discharge machine generally has and includes a fixed section for being fixed to a work fixing section of the biaxial rotation unit, an arm section which is provided to stand on the fixed section, and a section to be measured which is provided at a distal end of the arm section and has a conductive spherical surface.

4 Claims, 13 Drawing Sheets

(56) References Cited

U.S. PATENT DOCUMENTS

2015/0131697 A1* 5/2015 Sakai .............................. 374/56
2015/0176956 A1* 6/2015 Pettersson et al. ..... G01B 5/008

FOREIGN PATENT DOCUMENTS

| JP | 62-208826 A | 9/1987 |
| JP | 2-90033 U | 7/1990 |
| JP | 3-131427 A | 6/1991 |
| JP | 2010274337 A | 12/2010 |
| JP | 2012-236257 A | 12/2012 |

OTHER PUBLICATIONS

Extended European Search Report dated Sep. 19, 2014, corresponding to European patent application No. 14166431.8.

* cited by examiner

METHOD FOR MEASURING REFERENCE POINT OF INCLINED ROTATING TABLE IN WIRE ELECTRIC DISCHARGE MACHINE AND MEASURING JIG

RELATED APPLICATIONS

The present application claims priority to Japanese Application Number 2013-100710, filed May 10, 2013, the disclosure of which is hereby incorporated by reference herein in its entirety.

BACKGROUND OF THE INVENTION

1. Field of the Invention

The present invention relates to a method for measuring a reference point of an inclined rotating table at the time of machining using the inclined rotating table by a wire electric discharge machine and a measuring jig used for the measurement.

2. Description of the Related Art

In recent years, machining using an inclined rotating table has often been performed in wire electric discharge machines. For example, machining a gear having an inclined surface, such as a bevel gear, using a wire electric discharge machine has often been performed in these years. Since a wire electrode can be ordinarily inclined only by up to about 45° in machining (taper machining) of an inclined surface using a wire electric discharge machine, a bevel gear having a cone angle of, for example, 60° cannot be machined. It is thus common to attach a piece of work to a rotating table, incline the rotating table to near a cone angle of a bevel gear, and machine the piece of work with a wire electrode nearly vertical, when the piece of work is to be made into the bevel gear.

In general machining using a rotating table, a program is created using a point of intersection of a table center of the rotating table and a work-fixed surface as a reference point. In order to cause the reference point defined at the time of the program creation coincide with a coordinate position on an actual machine, the coordinates of the reference point on the machine need to be measured.

If a table center of a rotating table is parallel to an X-Y plane, reference coordinates on a machine are generally obtained by adjusting a jig in the shape of a round bar, called a test bar, such that the table center of the rotating table and a table center of the test bar coincide with each other, fixing the test bar to a work-fixed surface of the rotating table, and measuring the position of the test bar using a wire electrode or a probe.

In the case of machining with an inclined rotating table, reference coordinates can be measured using a probe with a test bar as described earlier fixed in the same manner. In a measuring method using a wire electrode, however, an end face edge of a test bar needs to be a sharp edge. In practice, a measurement error occurs due to the difficulty of machining of a sharp edge and the difficulty of stable measurement of an edge.

Additionally, a wire electrode center is separate from a probe center in a general wire electric discharge machine, and a relative distance between the centers is difficult to accurately obtain. Even if a relative distance is accurately obtained, the relative distance needs to be obtained with each probe replacement. This increases the time for measurement work.

Although a technique for measuring a machining reference point on an inclined rotating table is disclosed in Japanese Patent Laid-Open No. 2010-274337, the technique does not use a contact sensing function of a wire electrode which a wire electric discharge machine generally has.

SUMMARY OF THE INVENTION

In consideration of the above-described prior-art problems, an object of the present invention is to provide a measuring jig in a shape most suitable for reference point measurement using a contact sensing function of a wire electrode which a wire electric discharge machine generally has and a method for measuring a reference point on a table center of a rotating table using the measuring jig.

The present invention relates to a measuring method for obtaining a reference point on a table center of an inclined rotating table in a wire electric discharge machine using a measuring jig. The wire electric discharge machine takes, as an X-axis, a direction of lateral movement on a horizontal plane of the wire electric discharge machine that machines a workpiece by moving a wire electrode and the workpiece relative to each other while supporting the wire electrode with upper and lower wire guides, takes, as a Y-axis, a direction of longitudinal movement on the horizontal plane which is perpendicular to the X-axis, and takes, as a Z-axis, a direction of vertically upward movement. A biaxial rotation unit is placed on a table of the wire electric discharge machine, and the biaxial rotation unit includes a first rotating table which rotates a work fixing section that fixes a workpiece and a second rotating table which rotates about an axis orthogonal to the rotating table and inclines a workpiece with respect to an X-Y plane. The measuring jig includes a fixed section for being fixed to the work fixing section, an arm section which is provided to stand on the fixed section, and a section to be measured which is provided at a distal end of the arm section and has a conductive spherical surface.

A first aspect of a measuring method according to the present invention includes a step of measuring a height from a bottom surface of the fixed section of the measuring jig to a distal end of the spherical surface in the section to be measured of the measuring jig, a step of acquiring an angle of inclination of the second rotating table, a step of fixing the measuring jig to the work fixing section, a step of measuring a height from a table surface of the wire electric discharge machine to an upper end of the spherical surface, a step of bringing the wire electrode into contact with the spherical surface from opposing directions on a same straight line and measuring two points on the spherical surface, a step of bringing the wire electrode into contact with the spherical surface from a direction along a straight line which passes through a midpoint of the obtained two points and intersects the straight line at right angles and measuring one point on the spherical surface, a step of obtaining a center point position on the X-Y plane of the spherical surface on the basis of positions of the measured three points, and a step of calculating coordinates of a reference point on a table center of the second rotating table from the height from the bottom surface of the fixed section to the distal end of the spherical surface, the height from the table surface of the discharge machine to the upper end of the spherical surface, the angle of inclination of the second rotating table, and the center point position on the X-Y plane of the spherical surface, which are measured.

The step of acquiring the angle of inclination of the second rotating table can include a step of measuring positions of at least three points on a work-fixed surface of the second rotating table and a step of calculating angles which the work-fixed surface of the second rotating table forms with the Y-axis and the Z-axis from the measured positions of the at least three points.

The step of acquiring the angle of inclination of the second rotating table may be a step of reading a value of an encoder which is mounted on the second rotating table.

A second aspect of a measuring method according to the present invention includes a first step of measuring a height from a bottom surface of the fixed section of the measuring jig to a distal end of the spherical surface in the section to be measured of the measuring jig, a second step of fixing the measuring jig to the work fixing section, a third step of measuring a height from a table surface of the wire electric discharge machine to an upper end of the spherical surface, a fourth step of bringing the wire electrode into contact with the spherical surface from opposing directions on a same straight line and measuring two points on the spherical surface, a fifth step of bringing the wire electrode into contact with the spherical surface from a direction along a straight line which passes through a midpoint of the obtained two points and intersects the straight line at right angles and measuring one point on the spherical surface, a sixth step of obtaining a center point position on the X-Y plane of the spherical surface on the basis of positions of the measured three points, a seventh step of obtaining a center point position in an X-Y-Z space of the spherical surface from the height from the table surface of the discharge machine to the upper end of the spherical surface and the center point position on the X-Y plane of the spherical surface, an eighth step of further rotating the work fixing section to at least two different angle positions, performing the third to seventh steps at each of the positions, and obtaining at least two center point positions in the XY-Z space of the spherical surface, and a ninth step of calculating coordinates of a reference point on a table center of the second rotating table on the basis of the height from the bottom surface of the fixed section to the distal end of the spherical surface and the at least three center point positions obtained in the seventh step and the eighth step.

A measuring jig for obtaining coordinates of a reference point on a table center of a rotating table for attaching a piece of work in a state inclined with respect to a horizontal plane of a table of a wire electric discharge machine according to the present invention includes a fixed section for being fixed to the rotating table, an arm section which is provided to stand on the fixed section, and a section to be measured which is provided at a distal end of the arm section and has a conductive spherical surface.

According to the present invention, a measuring jig having a shape most suitable for reference point measurement using a contact sensing function of a wire electrode which a wire electric discharge machine generally has and a method for measuring a reference point on a table center of a rotating table using the measuring jig can be provided.

BRIEF DESCRIPTION OF THE DRAWINGS

The above-mentioned and other objects and features of the present invention will be apparent from the following description of embodiments in conjunction with the accompanying drawings, in which.

DETAILED DESCRIPTION OF THE PREFERRED EMBODIMENTS

A: A first embodiment of a method for measuring a reference point of an inclined rotating table according to the present invention will first be described with reference to FIGS. 1 to 10.

A biaxial rotation unit 1 with an inclined rotating table which is placed on a table surface of a wire electric discharge machine will be described with reference to FIG. 1.

Figure 1:
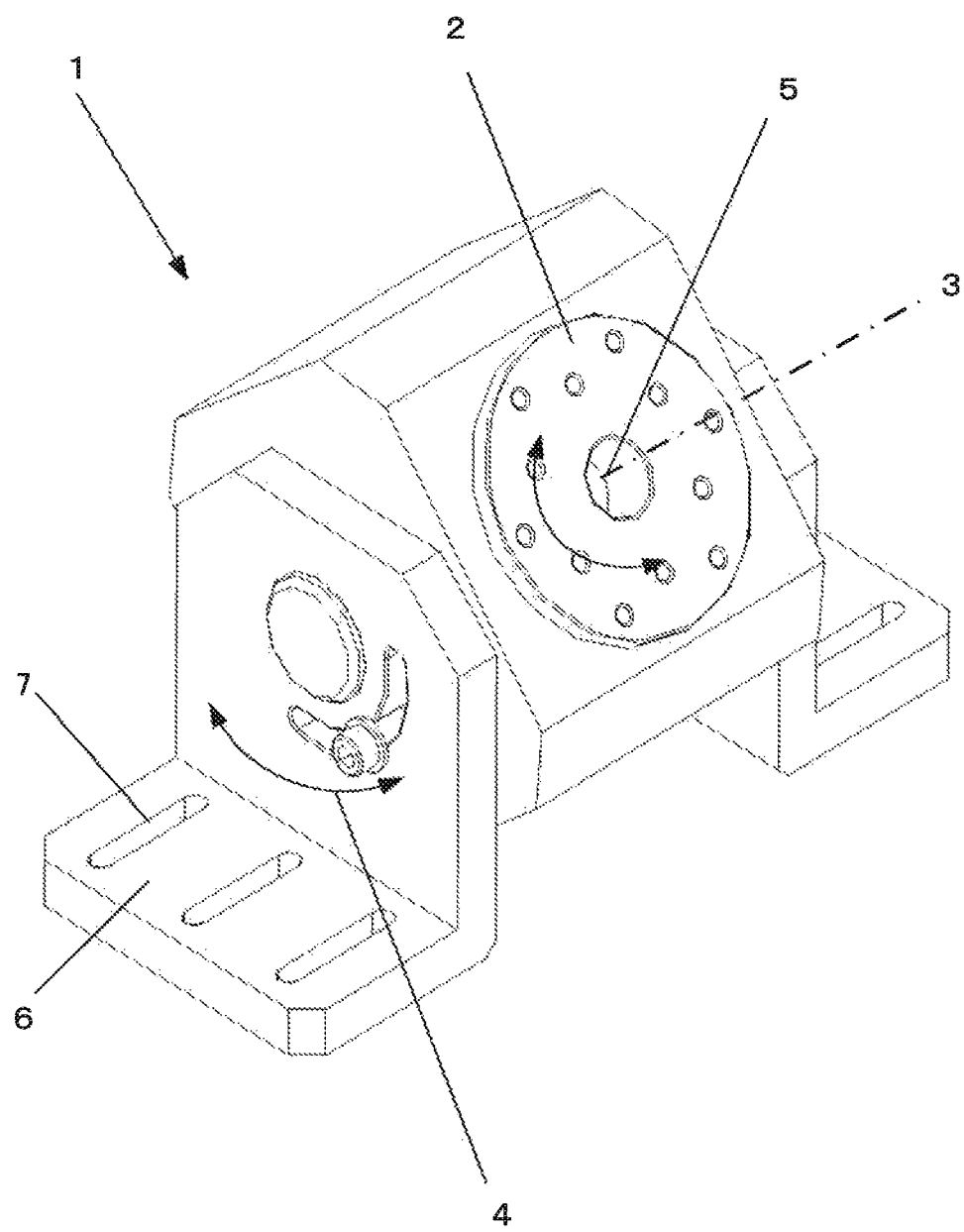
FIG. 1 is an external view of a biaxial rotation unit 1 with an inclined rotating shaft.

The biaxial rotation unit 1 shown in FIG. 1 includes a first rotating table which tilts in an inclination direction 4 and a second rotating table which rotates about an axis orthogonal to the inclination direction 4. Reference numeral 3 denotes a table center of the second rotating table. The biaxial rotation unit 1 is fixed to a table 8 (see FIG. 3) of the wire electric discharge machine by mounting a bolt in an elongated hole 7 which is provided in a basal section 6. Although the first rotating table is manually inclined in the inclination direction 4 in the biaxial rotation unit 1 in FIG. 1, the first rotating table may be automatically inclined by a motor or the like. A work fixing section 2 is configured to be rotatable by 360°. In machining using a rotating table, a rotation center of a work fixing section is commonly used as reference coordinates. A point A which is a rotation center of the work fixing section is used as reference coordinates 5 in this embodiment.

Figure 2A:
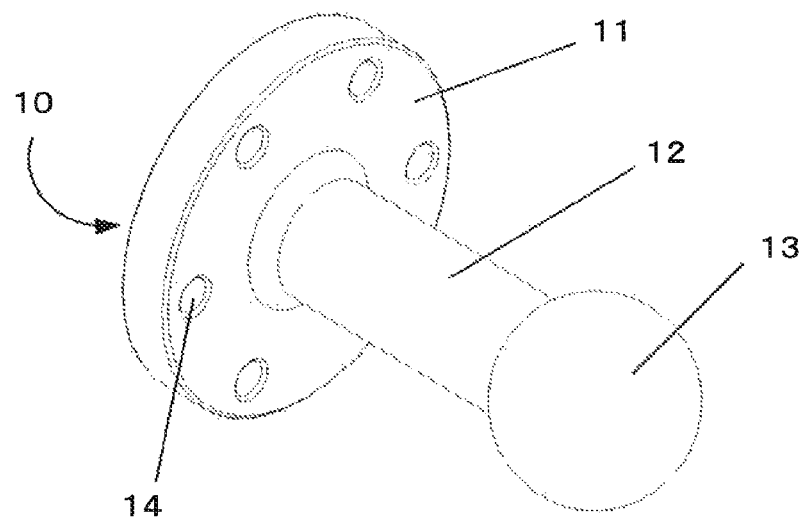
FIGS. 2A and 2B are a first example of a measuring jig according to the present invention.
Figure 2B:
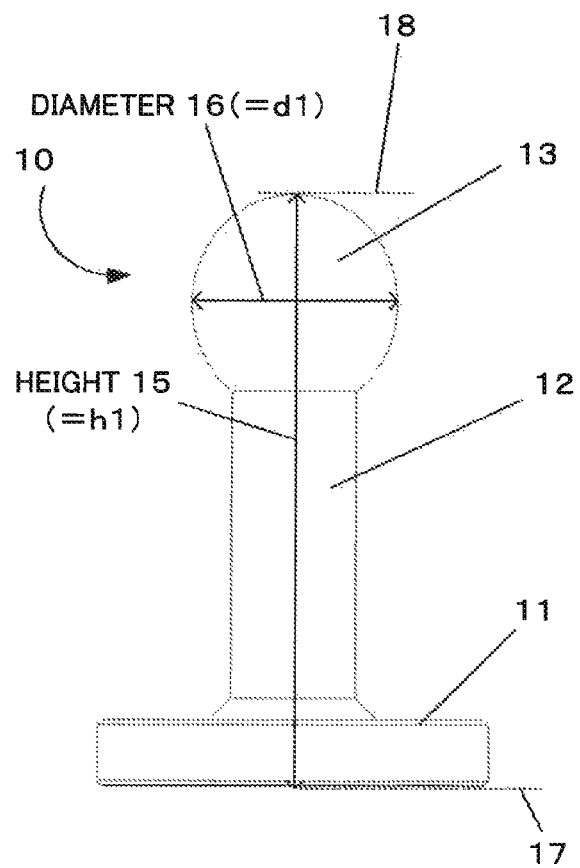

FIGS. 2A and 2B are an example of a measuring jig used in this embodiment.

A measuring jig 10 includes a fixed section 11 for fixing the measuring jig 10 to the work fixing section 2, a columnar arm section 12 which is provided to stand on the fixed section 11, and a section 13 to be measured (a spherical surface section) which is provided at a distal end of the arm section 12 and has a conductive spherical surface. In the measuring jig 10 used in this embodiment, the arm section 12 is provided to stand perpendicular to the fixed section 11. A plurality of bolt holes 14 for fixing the measuring jig 10 to the work fixing section 2 that is a table of the second rotating table are provided in the fixed section 11.

Since a contact sensing function of a wire electrode which a wire electric discharge machine generally has is used for reference point measurement in the present invention, at least the spherical surface section of the section 13 to be measured having the spherical surface needs to have conductivity in the measuring jig 10. The measuring jig 10 can be fabricated by a method, such as welding a high-accuracy ball (e.g., a bearing ball) to the distal end of the cylindrical arm section 12. The whole of the measuring jig 10 may be formed of a conductive material. If only the section 13 to be measured having the spherical surface is formed of a conductive material, the section 13 to be measured having the spherical surface and the work fixing section 2 need to be electrically connected.

A method for measuring the coordinates of a reference point on the table center 3 of the rotating table relative to machine coordinates, using the measuring jig 10 shown in FIGS. 2A and 2B will be described below.

Figure 3:
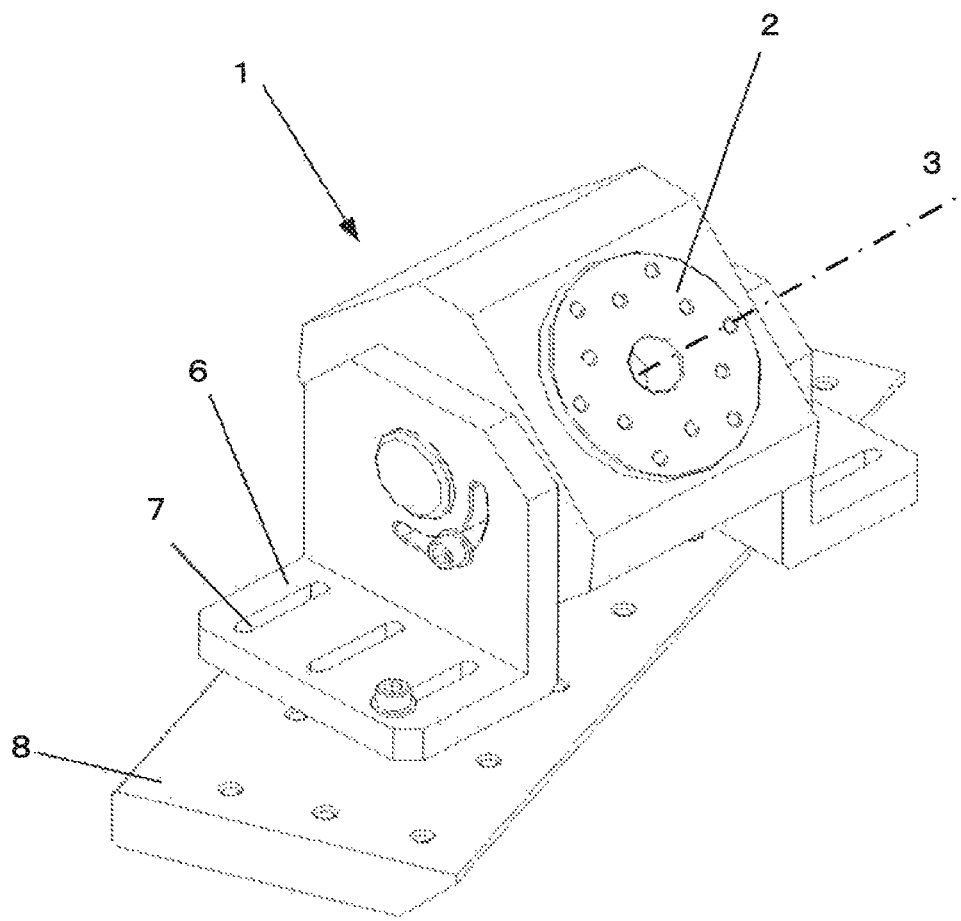
FIG. 3 is a view for explaining a state in which the biaxial rotation unit in FIG. 1 is installed on a table of machinery.
Figure 3:
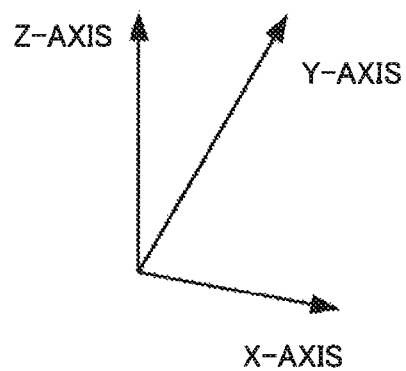

FIG. 3 is a view for explaining a state in which the biaxial rotation unit 1 shown in FIG. 1 is installed on the table 8 of the machinery (wire electric discharge machine).

A-1: First, a length (=h1) from a bottom surface of the fixed section 11 of the measuring jig 10 to a spherical surface distal end of the section 13 to be measured having the spherical surface (a height 15 which is the distance from a position 17 of the bottom surface of the fixed section 11 to a distal end position 18 of the section 13 to be measured having the spherical surface in FIG. 2B) and a diameter (=d1) of the section 13 to be measured having the spherical surface (a diameter 16 in FIG. 2B) are measured before attachment of the measuring jig 10 to the rotating table (the work fixing section 2 in FIG. 1) of the biaxial rotation unit 1. Values (h1 and d1) obtained through the measurement of the height and the diameter can be repeatedly used after the values are once measured.

Figure 4:
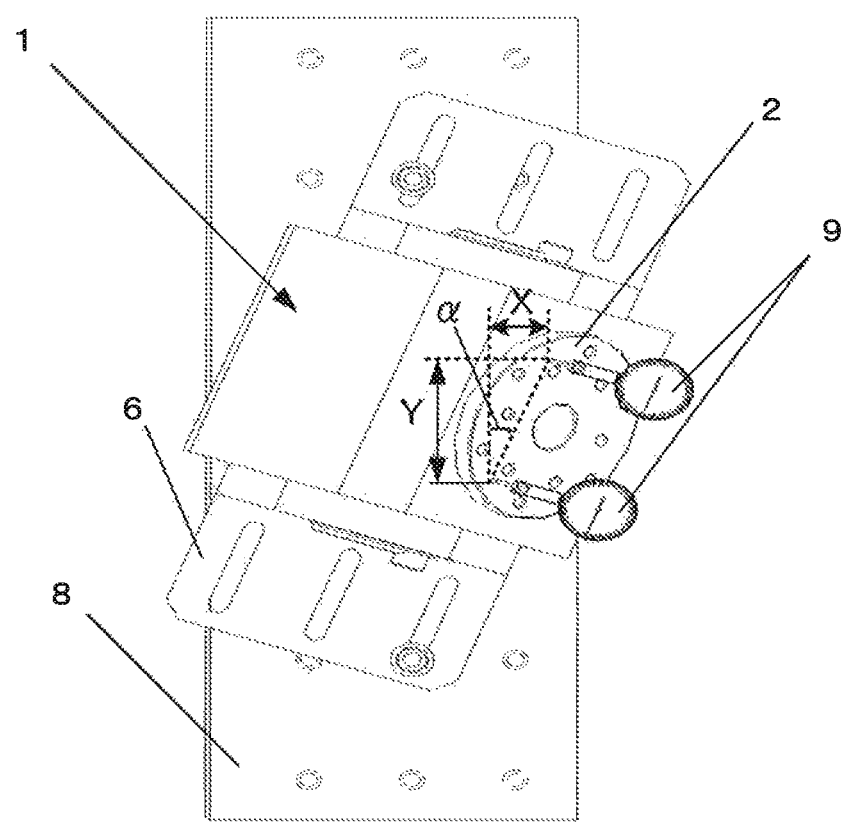
FIG. 4 is a view for explaining a process of measuring an angle (=α) which a line of intersection of an X-Y plane and a work-fixed surface of the biaxial rotation unit in FIG. 1 forms with a Y-axis.
Figure 4:
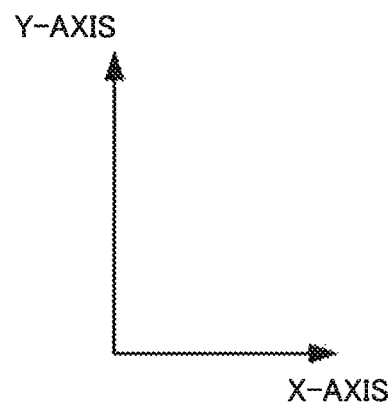

A-2: As shown in FIG. 4, an angle (=α) which a line of intersection of an X-Y plane on which the table 8 of the wire electric discharge machine is placed and a work-fixed surface of the work fixing section 2 in the biaxial rotation unit 1 forms with a Y-axis is measured. Generally, an indicator 9 or the like is fixed to an upper wire electrode holding section (not shown) of the machinery, the positions of two points on the work-fixed surface of the work fixing section 2 are measured without changing a height in a Z-axis direction, and the angle α is obtained from the height in the Z-axis direction and measured X and Y coordinate values of the two points.

Figure 5:
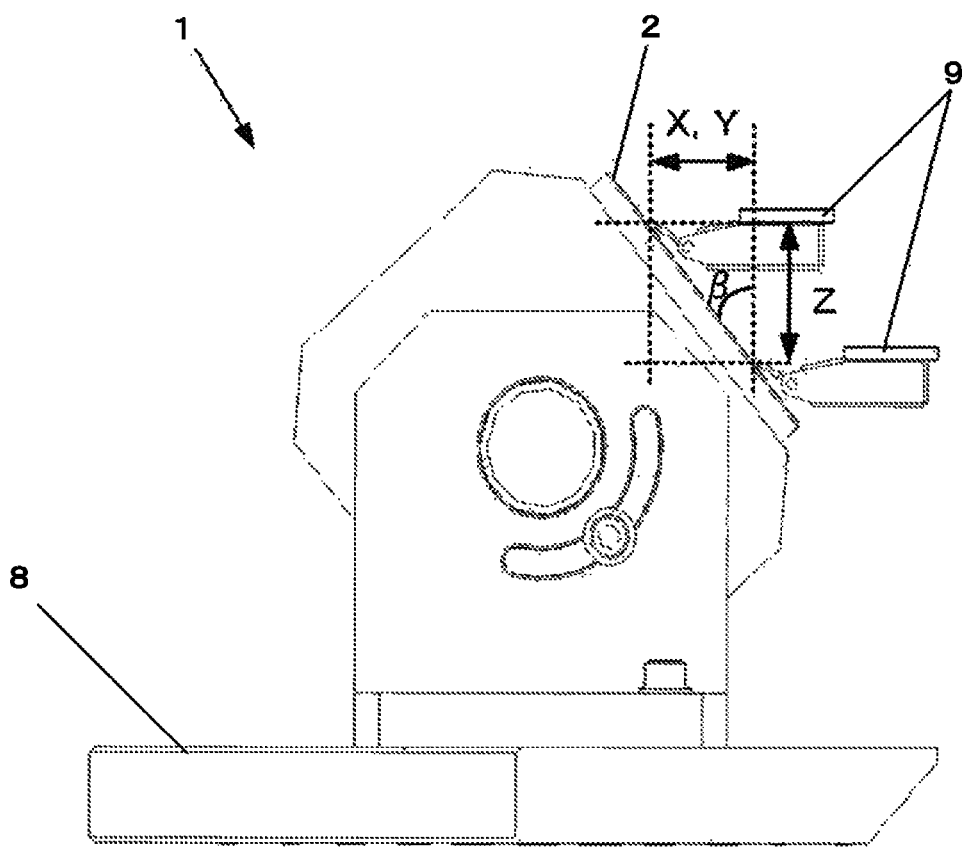
FIG. 5 is a view for explaining a process of measuring an angle (=β) which the X-Y plane forms with the work-fixed surface of the biaxial rotation unit in FIG. 1.
Figure 5:
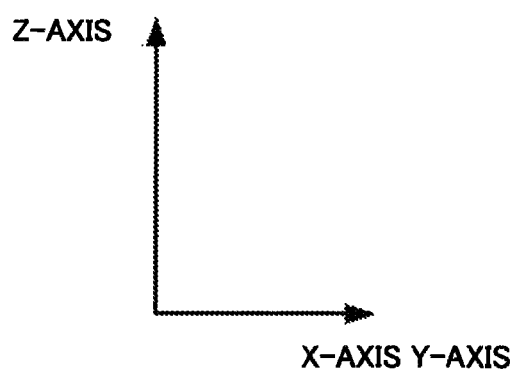

A-3: As shown in FIG. 5, an angle (=β) which the X-Y plane forms with the work-fixed surface of the work fixing section 2 is measured. In the same manner as described earlier in A-2, the angle β is obtained from heights in the Z-axis direction and measured X and Y coordinate values of two points, using the indicator 9 or the like.

Note that since the rotating table (work fixing section 2) of the biaxial rotation unit 1 is manually inclined in this embodiment, the above-described measurement of the angles (α and β) is necessary. However, if the rotating table includes an encoder which measures an angle of inclination, like a biaxial rotating table, the procedure can be automatically performed.

Figure 6:
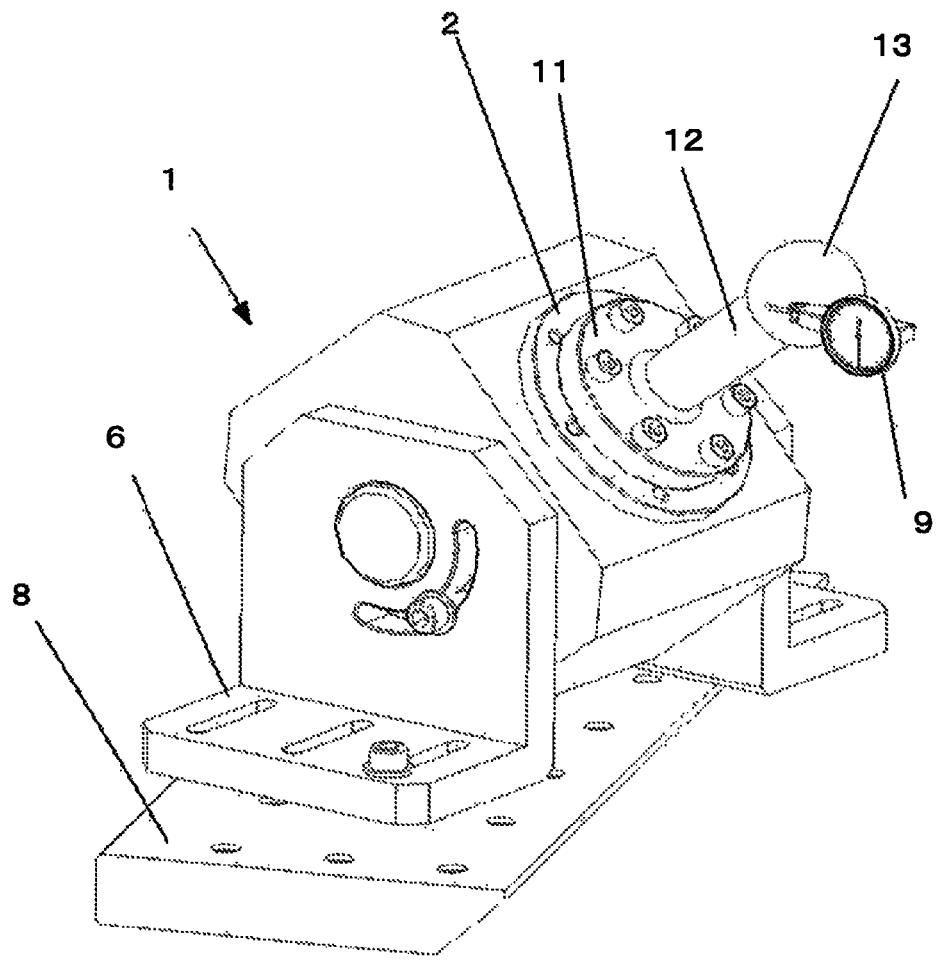
FIG. 6 is a view for explaining a process of temporarily fixing a measuring jig in FIG. 2A to the work-fixed surface of a work fixing section of the biaxial rotation unit in FIG. 1 and adjusting the measuring jig such that a center of a spherical surface (a section to be measured) of the measuring jig falls on a table center of the rotating table.
Figure 6:
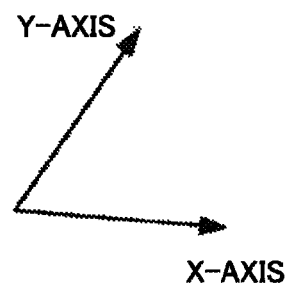

A-4: As shown in FIG. 6, the measuring jig 10 is temporarily fixed to the work-fixed surface of the work fixing section 2. The rotating table (work fixing section 2) of the biaxial rotation unit 1 is turned while the indicator 9 is made to abut on the section 13 to be measured having the spherical surface. The rotating table is adjusted such that a center of the section 13 to be measured having the spherical surface falls on the table center 3 of the rotating table.

Figure 7:
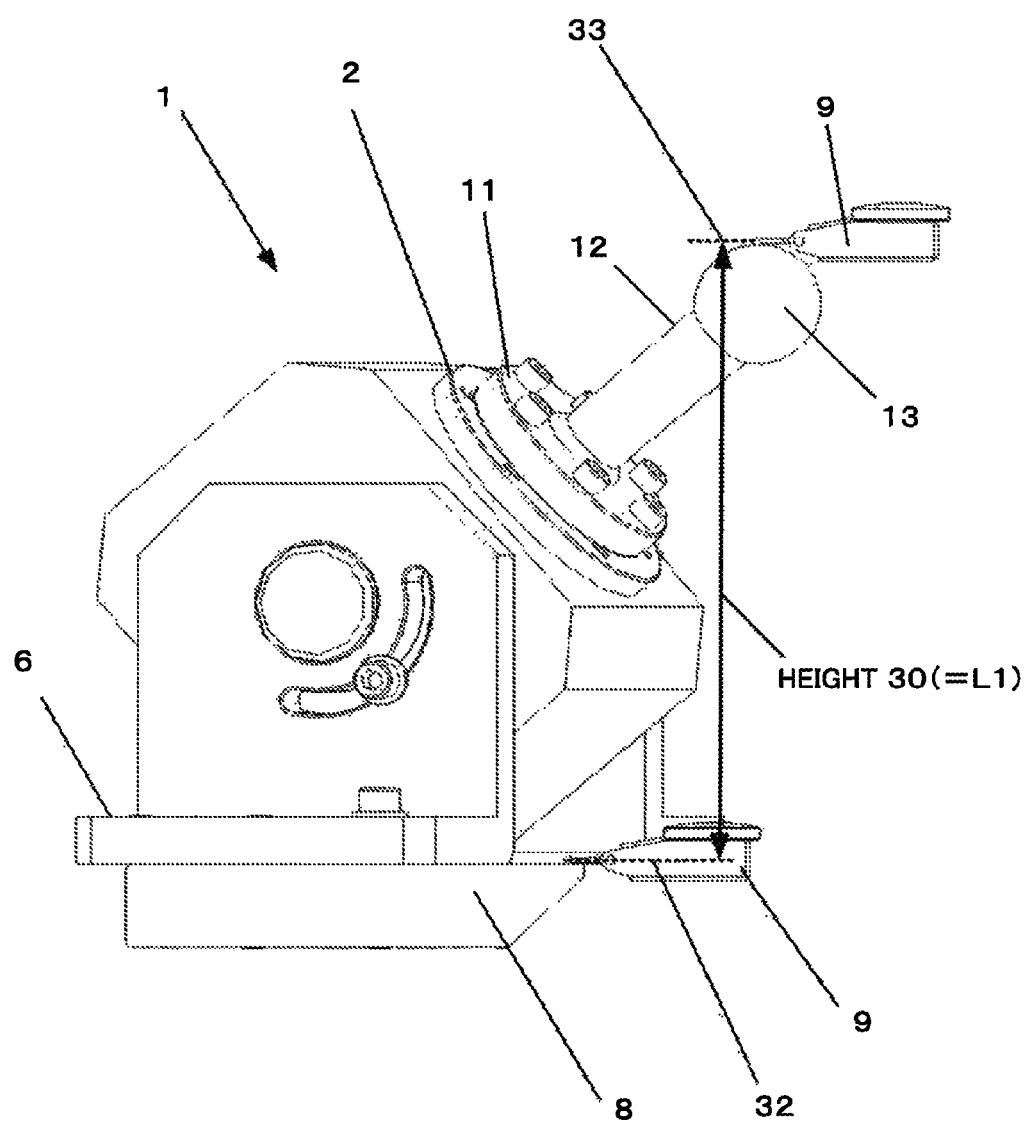
FIG. 7 is a view for explaining a process of measuring a height (=L1) from a table surface to an upper end of a sphere of the measuring jig in FIG. 2A.

A-5: As shown in FIG. 7, a height 30 (=L1) from an upper surface (table surface 32) of the table 8 of the wire electric discharge machine to the position of an upper end 33 of the spherical surface of the section to be measured is measured by the indicator 9 or the like.

Figure 8:
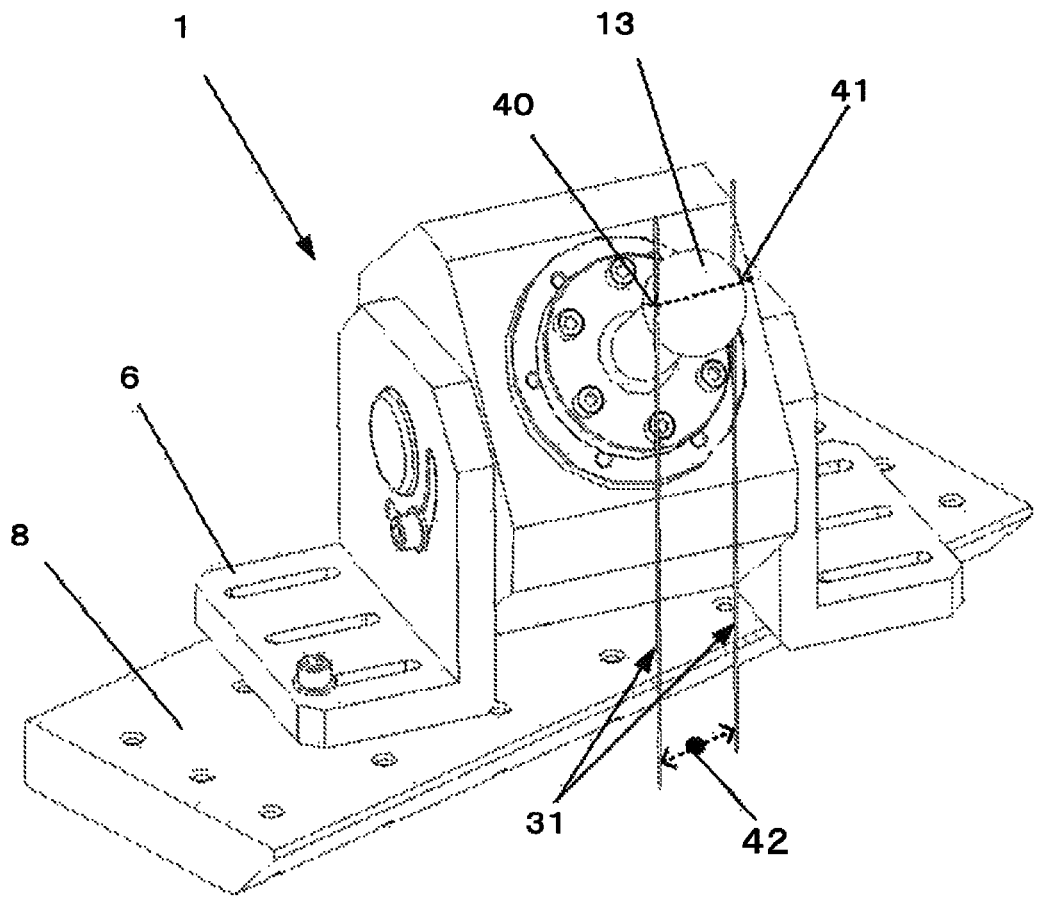
FIG. 8 is a view for explaining a process of measuring a center position (=y1) in a Y-axis direction of the sphere of the measuring jig in FIG. 2A.
Figure 8:
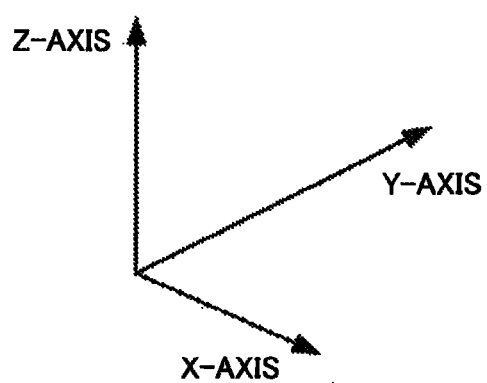

A-6: As shown in FIG. 8, end faces of the section 13 to be measured having the spherical surface are detected from two sides in a Y-axis direction of the section 13 to be measured having the spherical surface, using a wire electrode 31 and a contact sensing function of the wire electric discharge machine. A center position 42 (=y1) in the Y-axis direction of the section 13 to be measured having the spherical surface is obtained from the positions (contact sensing 40 and 41) of the two detected end faces.

Figure 9:
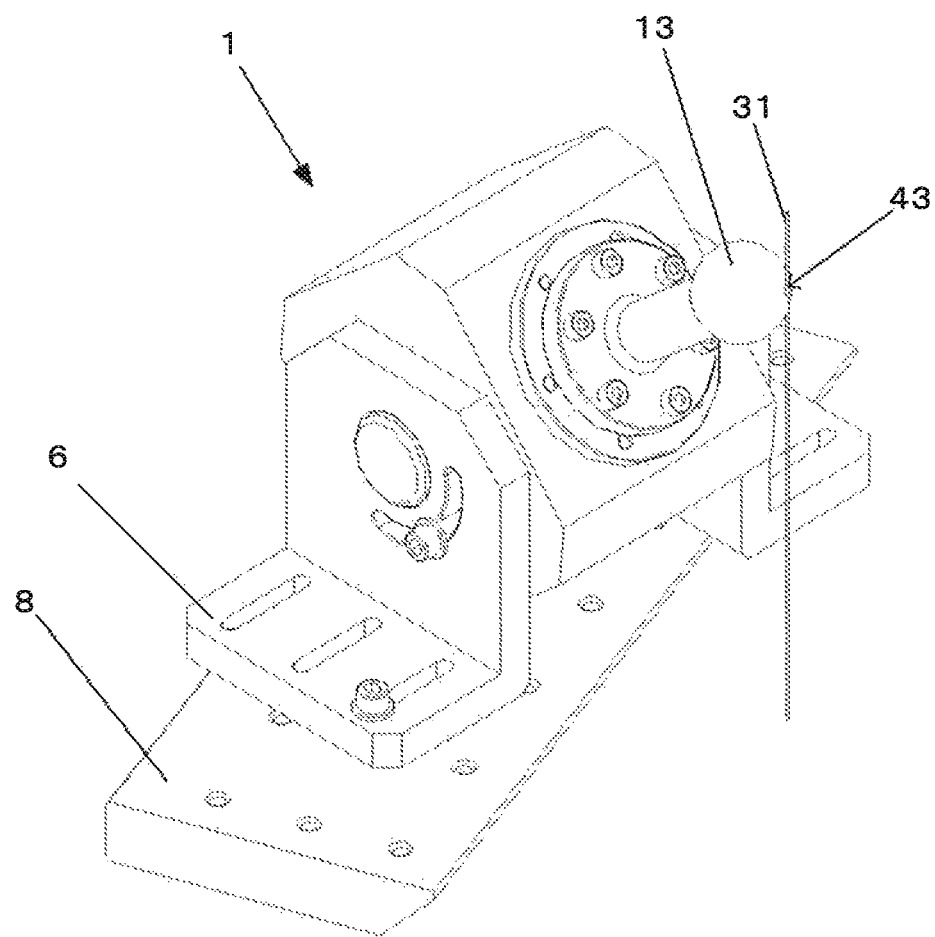
FIG. 9 is a view for explaining a process of measuring a an end face in an X-axis direction of the sphere of the measuring jig in FIG. 2A.
Figure 9:
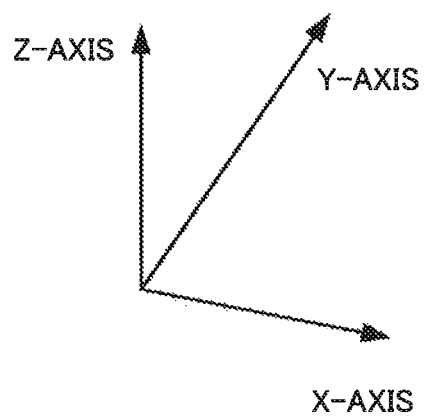

A-7: As shown in FIG. 9, the wire electrode 31 is moved to the center position 42 in the Y-axis direction obtained in A-6 described earlier, contact sensing (contact sensing 43) is performed on the section 13 to be measured having the spherical surface from an X-axis direction, and an end face position (=x1) in the X-axis direction is measured.

A-8: The coordinates of a center point of the section 13 to be measured having the spherical surface can be obtained from measured values obtained by the above procedures, as indicated by expression (1) below.

(a1) The coordinates of the center point of the section 13 to be measured having the spherical surface $$(x, y, z) = \left(x1 - \frac{d1}{2}, y1, L1 - \frac{d1}{2}\right) \quad (1)$$

A1-9: When the coordinates of the center point of the section 13 to be measured having the spherical surface are obtained, the coordinates of the reference point on the table center 3 of the rotating table in the biaxial rotation unit 1 are obtained using expression (2) below.

(a2) The coordinates of the reference point on the table center of the rotating table $$(x, y, z) = \left(x1 - \frac{d1}{2} - \left(h1 - \frac{d1}{2}\right) \cdot \cos\alpha\cos\beta,\right.$$
$$\left. y1 - \left(h1 - \frac{d1}{2}\right) \cdot \sin\alpha\cos\beta, L1 - \frac{d1}{2} - \left(h1 - \frac{d1}{2}\right) \cdot \sin\beta\right) \quad (2)$$

Figure 10:
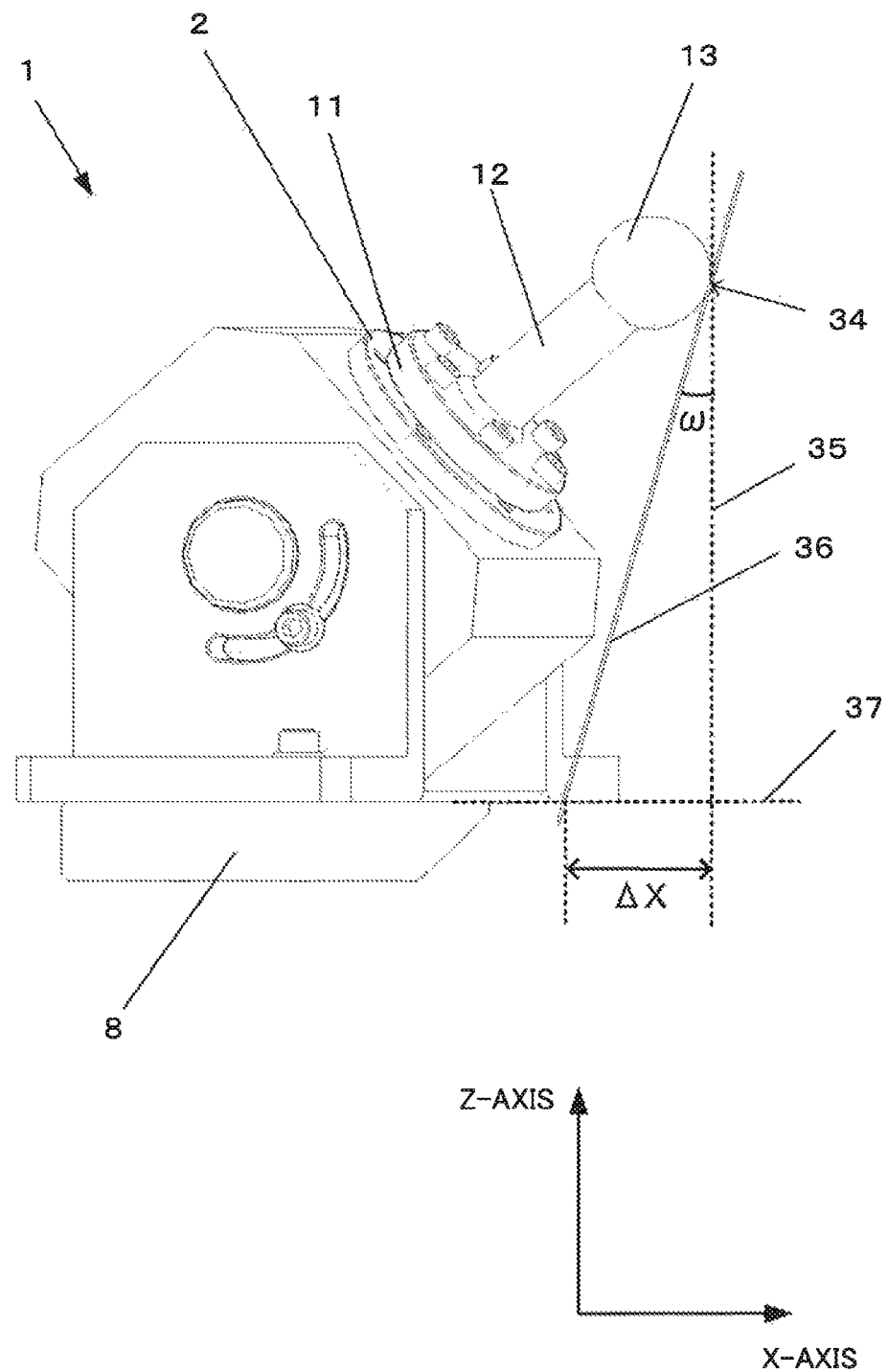
FIG. 10 is a view for explaining a process of measuring the height (L1) shown in FIG. 7 of the sphere of the measuring jig using a taper machining function.

Note that, to measure the height 30 (=L1) of the section 13 to be measured having the spherical surface in A-5 described earlier, the procedure below can also be performed as shown in FIG. 10, instead of the measurement in A-7 described earlier. It is possible to perform contact sensing from the X-axis direction through use of a taper machining function, which the wire electric discharge machine has as standard, with the table surface 32 of the table 8 set as a program plane 37 and the wire electrode 31 inclined at an angle (=ω) set in advance, measure a difference (=Δx) between X-axis values obtained through contact sensing when the wire electrode 31 is perpendicular and contact sensing when the wire electrode 31 is inclined by the angle ω, and calculate the height L1 of the section 13 to be measured having the spherical surface from the difference Δx according to expression (3) below.

$$L1 = \frac{\Delta x}{\tan \omega} + \frac{d1}{2}\left(1 + \tan\frac{\omega}{2}\right) \quad (3)$$

As described above, the coordinates of the reference point on the table center 3 of the rotating table (work fixing section 2) in the biaxial rotation unit 1 can be obtained by using the measuring jig 10 shown in FIGS. 2A and 2B.

As for the procedures in A-6, A-7, and A-8 described earlier, program-based automatic measurement can be adopted. The procedure in A-5 can also be automated by using the method in A-9 described earlier. If the rotating table (work fixing section 2) of the biaxial rotation unit 1 is a rotating table with an encoder or the like which can automatically measure the angles (α and β), all the procedures except for that in A-4 described earlier can be automated.

B: A second embodiment of a method for measuring a reference point of an inclined rotating table according to the present invention will be described with reference to FIGS. 11A to 12.

In this embodiment, a measuring jig (see FIGS. 11A and 11B) which is different in shape from the measuring jig (FIGS. 2A and 2B) used in the first embodiment is used. The measuring jig used in this embodiment is different from the measuring jig 10 used in the first embodiment and is shaped such that a center of a section to be measured having a spherical surface cannot be brought onto a table center 3 of a rotating table (a work fixing section 2) of a biaxial rotation unit 1.

Figure 11A:
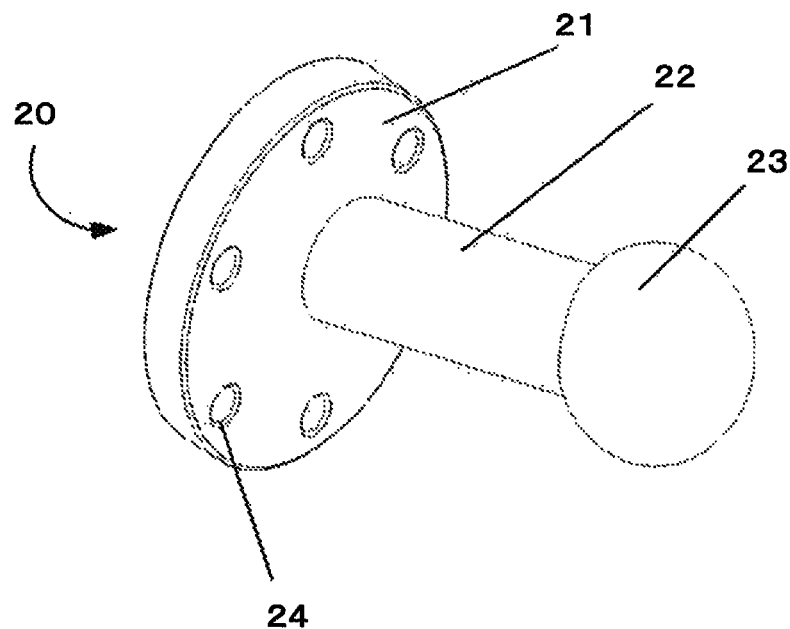
FIGS. 11A and 11B are a second example of a measuring jig according to the present invention.
Figure 11B:
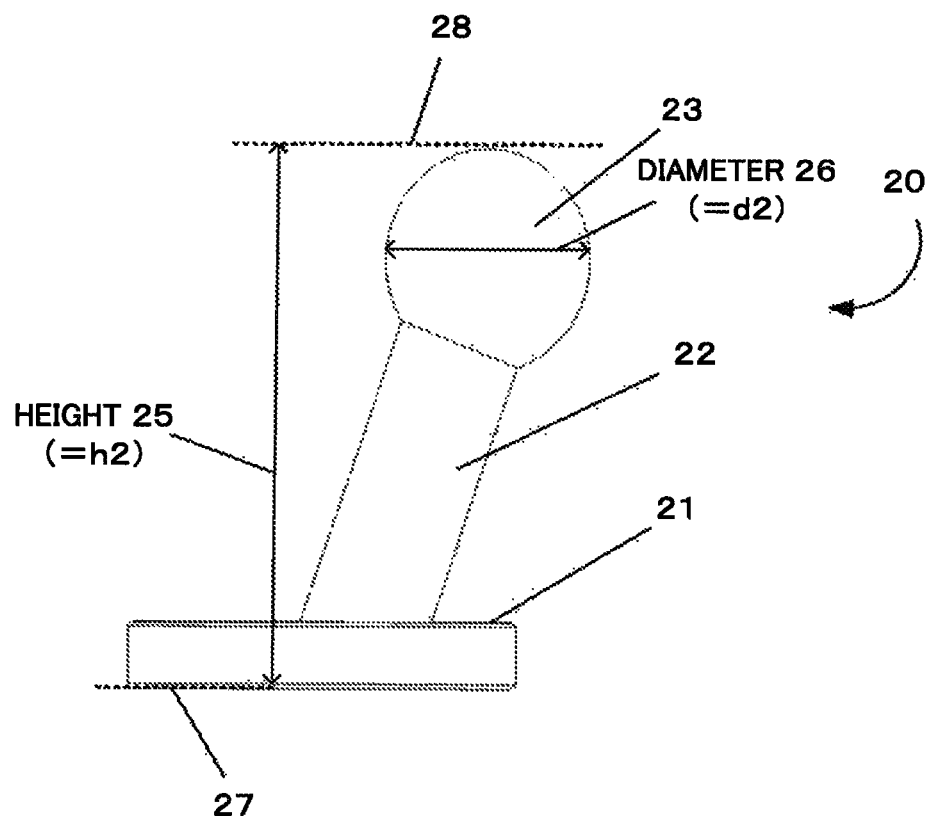

A measuring jig 20 includes a fixed section 21 for being fixed to the rotating table (work fixing section 2) of the biaxial rotation unit 1, a columnar arm section 22 which is provided to stand on the fixed section 21, and a section 23 to be measured (a spherical surface section) which is provided at a distal end of the arm section 22 and has a conductive spherical surface. As shown in FIGS. 11A and 11B, in the measuring jig 20, the arm section 22 is provided to stand inclined with respect to a direction perpendicular to the fixed section 21. A plurality of bolt holes 24 for fixing the measuring jig 20 to the rotating table (work fixing section 2) of the biaxial rotation unit 1 are provided in the fixed section 21.

Since a contact sensing function of a wire electrode which a wire electric discharge machine generally has is used for reference point measurement in the present invention, at least the spherical surface of the section 23 to be measured having the spherical surface needs to have conductivity in the measuring jig 20. The measuring jig 20 can be fabricated by a method, such as welding a high-accuracy ball (e.g., a bearing ball) to the distal end of the cylindrical arm section 22. The whole of the measuring jig 20 may be formed of a conductive material. If only the section 23 to be measured having the spherical surface is formed of a conductive material, the section 23 to be measured having the spherical surface and the work fixing section 2 need to be electrically connected.

As in the first embodiment described earlier, a length (=h2) from a bottom surface of the fixed section 21 of the measuring jig 20 to a spherical surface distal end of the section 23 to be measured having the spherical surface (a height 25 which is the distance from a position 27 of the bottom surface of the fixed section 21 to a distal end position 28 of the section 23 to be measured having the spherical surface in FIG. 11B) and a diameter (=d2) of a sphere of the section 23 to be measured having the spherical surface (a diameter 26 in FIG. 11B) are measured before attachment of the measuring jig 20 to the rotating table (work fixing section 2) of the biaxial rotation unit 1. Values (h2 and d2) obtained through the measurement of the height and the diameter can be repeatedly used after the values are once measured.

Unlike the first embodiment described earlier, angles (α and β) of the rotating table (work fixing section 2) of the biaxial rotation unit 1 need not be obtained in this embodiment. Note that calculation that determines a measurement start position at the time of obtaining a center of the section 23 to be measured having the spherical surface requires the angles (α and β) of the rotating table (work fixing section 2) of the biaxial rotation unit 1 if measurement automation using a program or the like is contemplated.

The measuring jig 20 is attached to a work-fixed surface of the rotating table. Note that adjustment as in A-3 described earlier that brings the center of the section 23 to be measured having the spherical surface onto the table center of the rotating table is not performed.

Figure 12:
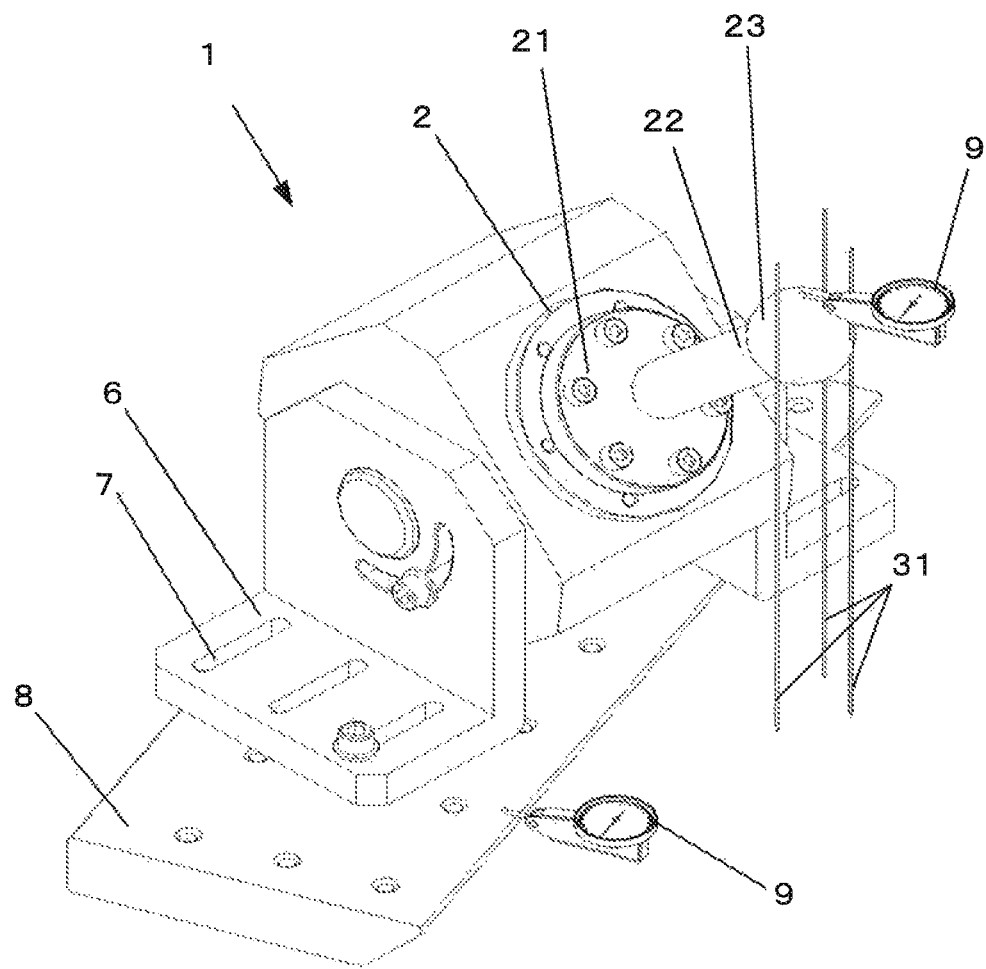
FIG. 12 is a view for explaining a process of obtaining center coordinates of a section to be measured having a spherical surface of a measuring jig in FIG. 11A.
Figure 12:
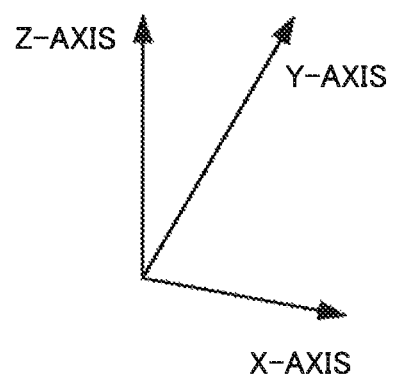

B-1: As shown in FIG. 12, the rotating table (work fixing section 2) of the biaxial rotation unit 1 is moved to an appropriate angle, and the coordinates of the center of the section 23 to be measured having the spherical surface are obtained through the same work as in A-5, A-6, and A-7 described earlier.

B-2: The rotating table (work fixing section 2) of the biaxial rotation unit 1 is then moved to an appropriate angle which is different from the angle in B-1 described earlier, and the center of the section 23 to be measured having the spherical surface is obtained in the same manner as described in B-1.

B-3: The rotating table (work fixing section 2) of the biaxial rotation unit 1 is further moved to an appropriate angle which is different from the angles in B-1 and B-2 described earlier, and the center of the section 23 to be measured having the spherical surface is obtained in the same manner as described in B-1.

B-4: A circumcenter of a triangle having as vertexes three points obtained in B-1, B-2, and B-3 described earlier falls on a point of intersection of the table center 3 of the rotating table (work fixing section 2) in the biaxial rotation unit 1 with a plane passing through the three points. Thus, coordinates (e,f,g) of a reference point to be obtained are represented by expression (4) below using coordinates (a,b,c) of the circumcenter, a normal vector (l,m,n) of the plane passing through the three points, and the height h2 obtained earlier of the jig.

$$(e, f, g) = \left(\frac{l}{\sqrt{l^2 + m^2 + n^2}}\left(h2 - \frac{d2}{2}\right) + a,\right. \quad (4)$$
$$\left.\frac{m}{\sqrt{l^2 + m^2 + n^2}}\left(h2 - \frac{d2}{2}\right) + b, \frac{n}{\sqrt{l^2 + m^2 + n^2}}\left(h2 - \frac{d2}{2}\right) + c\right)$$

As described above, the coordinates of the reference point on the table center 3 of the rotating table (work fixing section 2) in the biaxial rotation unit 1 can be obtained in the same manner even with use of the measuring jig 20 as shown in FIGS. 11A and 11B. As described earlier, even if the jig in FIG. 12 is used, measurement automation based on a program or the like is possible.

C: An example of the wire electric discharge machines described earlier having the biaxial rotation unit 1 arranged on the table 8 will be described.

A wire electric discharge machine 50 is machinery which machines a piece of work (not shown) serving as a workpiece by producing discharge between a wire electrode 31 and the piece of work. The wire electric discharge machine 50 includes, on a pedestal 51, an X-axis saddle 54 which moves in an X-axis direction by a ball screw 53 which an X-axis motor 52 drives and includes, on the X-axis saddle 54, a Y-axis saddle 57 which moves in a Y-axis direction by a ball screw 56 which a Y-axis motor 55 drives. A work tank 58 which incorporates the table 8 where the biaxial rotation unit 1 is to be placed is fixed on the Y-axis saddle 57.

A column 60 is made to stand perpendicularly on the pedestal 51. A lower arm 61 is horizontally attached to a side surface section of the column 60. A lower nozzle 62 and a lower wire guide 63 are attached to a distal end of the lower arm 61. The lower nozzle 62 and the lower wire guide 63 are located below the table 8. The column 60 includes a V-axis saddle 64 at an upper section. The V-axis saddle 64 moves in a V-axis direction by a ball screw 66 which a V-axis motor 65 drives. The V-axis direction is the same as the Y-axis direction. A U-axis table 67 is attached to the V-axis saddle 64. The U-axis table 67 moves in a U-axis direction by a ball screw 69 which a U-axis motor 68 drives. The U-axis direction is the same as the X-axis direction.

An upper arm supporting member 70 is attached to the U-axis table 67. The upper arm supporting member 70 moves in a Z-axis direction by a ball screw 72 which a Z-axis motor 71 drives. An upper arm 73 is fixed to the upper arm supporting member 70. An upper nozzle 74 and an upper wire guide 75 are attached to an end section of the upper arm 73.

The X-axis motor 52, the Y-axis motor 55, the Z-axis motor 71, the U-axis motor 68, and the V-axis motor 65 are connected to a control device 80 by power and signal lines 83, 84, 85, 86, and 87, respectively. The motors are supplied with motive power (electric power) from the control device 80 including an amplifier (not shown) and give and receive various signals to and from the control device 80. Note in FIG. 13 that an X-axis and a U-axis are along a direction perpendicular to the sheet surface, that a Y-axis and a V-axis are along a horizontal direction of the sheet surface, and that a Z-axis is a vertical direction of the sheet surface.

Figure 13:
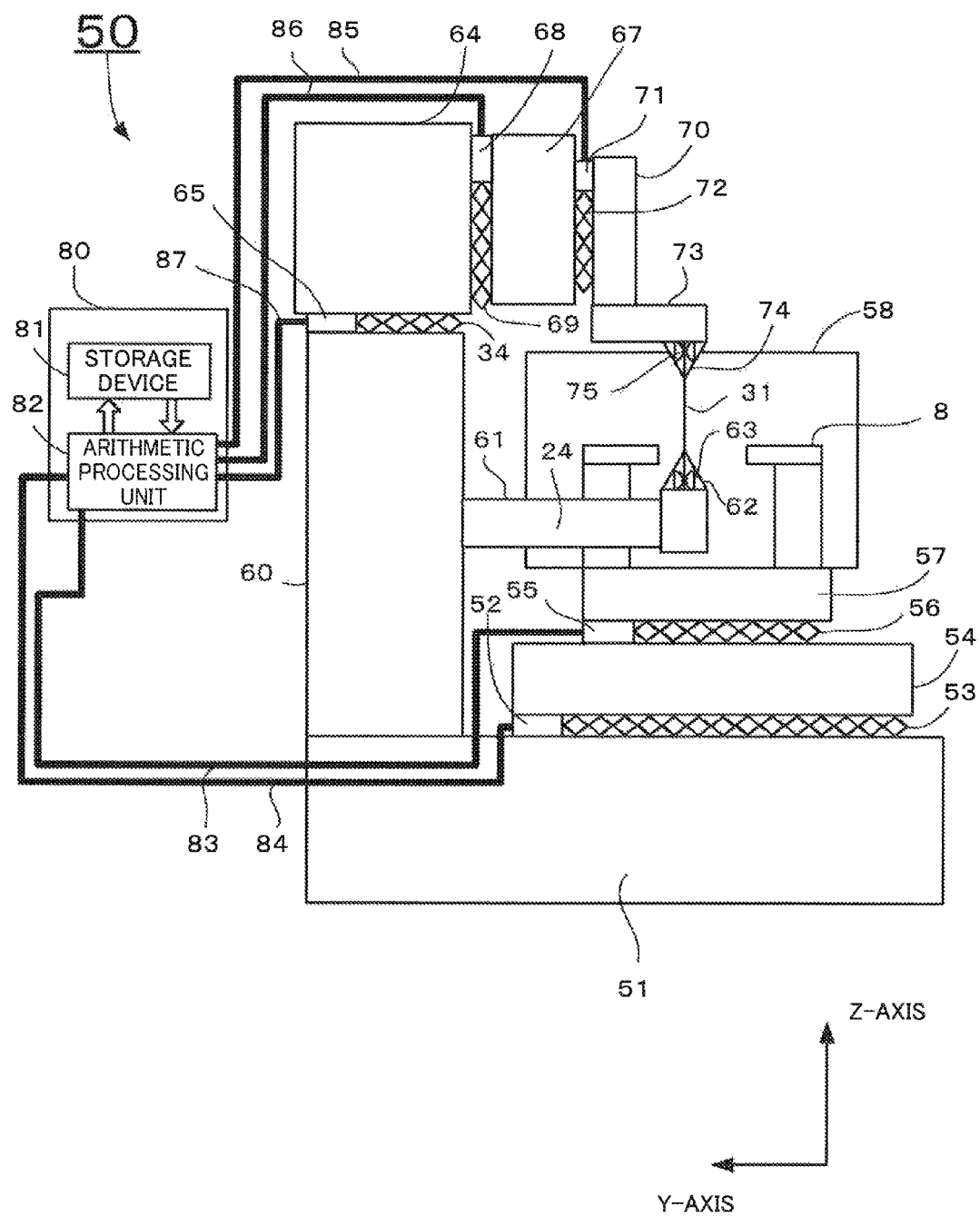
FIG. 13 is a view for explaining the outline of the configuration of a wire electric discharge machine.

The control device 80 is a device which performs overall control of the wire electric discharge machine, includes an arithmetic unit, a display device, I/O interfaces for various signals, and an amplifier (not shown), and further includes a storage device 81 which stores various data. In FIG. 13, the arithmetic unit, the display device, the I/O interfaces for various signals, and the amplifier (not shown) are collectively called an arithmetic processing unit 82.

The invention claimed is:

1. A measuring method for obtaining a reference point on a table center of an inclined rotating table in a wire electric discharge machine using a measuring jig, wherein
    an X-axis is a direction of lateral movement on a horizontal plane of the wire electric discharge machine that machines a workpiece by moving a wire electrode and the workpiece relative to each other while supporting the wire electrode with upper and lower wire guides,
    a Y-axis is a direction of longitudinal movement on the horizontal plane which is perpendicular to the X-axis,
    a Z-axis is a direction of vertically upward movement,
    a biaxial rotation unit is placed on a table of the wire electric discharge machine, the biaxial rotation unit including
        a first rotating table which rotates a work fixing section that fixes the workpiece, and
        a second rotating table which rotates about an axis orthogonal to the rotating table and inclines the workpiece with respect to an X-Y plane, and
    the measuring jig includes
        a fixed section for being fixed to the work fixing section,
        an arm section which is provided to stand on the fixed section, and
        a section to be measured which is provided at a distal end of the arm section and has a conductive spherical surface,
    the measuring method comprising:
        a step of measuring a height from a bottom surface of the fixed section of the measuring jig to a distal end of the spherical surface in the section to be measured of the measuring jig;
        a step of acquiring an angle of inclination of the second rotating table;
        a step of fixing the measuring jig to the work fixing section;
        a step of measuring a height from a table surface of the wire electric discharge machine to an upper end of the spherical surface;
        a step of bringing the wire electrode into contact with the spherical surface from opposing directions on a same straight line and measuring two points on the spherical surface;
        a step of bringing the wire electrode into contact with the spherical surface from a direction along a straight line which passes through a midpoint of the obtained two points and intersects the straight line at right angles and measuring one point on the spherical surface;
        a step of obtaining a center point position on the X-Y plane of the spherical surface on the basis of positions of the measured three points; and
        a step of calculating coordinates of a reference point on a table center of the second rotating table from the height from the bottom surface of the fixed section to the distal end of the spherical surface, the height from the table surface of the discharge machine to the upper end of the spherical surface, the angle of inclination of the second rotating table, and the center point position on the X-Y plane of the spherical surface, which are measured.

2. The measuring method for coordinates of the reference point on the table center of the inclined rotating table in the wire electric discharge machine according to claim 1, wherein
    the step of acquiring the angle of inclination of the second rotating table comprises
        a step of measuring positions of at least three points on a work-fixed surface of the second rotating table and
        a step of calculating angles which the work-fixed surface of the second rotating table forms with the Y-axis and the Z-axis from the measured positions of the at least three points.

3. The measuring method for coordinates of the reference point on the table center of the inclined rotating table in the wire electric discharge machine according to claim 1, wherein
    the step of acquiring the angle of inclination of the second rotating table is a step of reading a value of an encoder which is mounted on the second rotating table.

4. A measuring method for obtaining a reference point on a table center of an inclined rotating table in a wire electric discharge machine using a measuring jig, wherein
    an X-axis is a direction of lateral movement on a horizontal plane of the wire electric discharge machine that machines a workpiece by moving a wire electrode and the workpiece relative to each other while supporting the wire electrode with upper and lower wire guides,
    a Y-axis is a direction of longitudinal movement on the horizontal plane which is perpendicular to the X-axis,
    a Z-axis is a direction of vertically upward movement, a biaxial rotation unit is placed on a table of the wire electric discharge machine, the biaxial rotation unit including
- a first rotating table which rotates a work fixing section that fixes the workpiece, and
- a second rotating table which rotates about an axis orthogonal to the rotating table and inclines the workpiece with respect to an X-Y plane, and the measuring jig includes
- a fixed section for being fixed to the work fixing section,
- an arm section which is provided to stand on the fixed section, and
- a section to be measured which is provided at a distal end of the arm section and has a conductive spherical surface, the measuring method comprising:

a first step of measuring a height from a bottom surface of the fixed section of the measuring jig to a distal end of the spherical surface in the section to be measured of the measuring jig;

a second step of fixing the measuring jig to the work fixing section;

a third step of measuring a height from a table surface of the wire electric discharge machine to an upper end of the spherical surface;

a fourth step of bringing the wire electrode into contact with the spherical surface from opposing directions on a same straight line and measuring two points on the spherical surface;

a fifth step of bringing the wire electrode into contact with the spherical surface from a direction along a straight line which passes through a midpoint of the obtained two points and intersects the straight line at right angles and measuring one point on the spherical surface;

a sixth step of obtaining a center point position on the X-Y plane of the spherical surface on the basis of positions of the measured three points;

a seventh step of obtaining a center point position in an X-Y-Z space of the spherical surface from the height from the table surface of the discharge machine to the upper end of the spherical surface and the center point position on the X-Y plane of the spherical surface;

an eighth step of further rotating the work fixing section to at least two different angle positions, performing the third to seventh steps at each of the positions, and obtaining at least two center point positions in the X-Y-Z space of the spherical surface; and a ninth step of calculating coordinates of a reference point on a table center of the second rotating table on the basis of the height from the bottom surface of the fixed section to the distal end of the spherical surface and the at least three center point positions obtained in the seventh step and the eighth step.

\* \* \* \* \*